United States Patent Office 3,139,386
Patented June 30, 1964

3,139,386
METHOD FOR PRODUCING L-METHIONINE
Shigeshi Takesue, Kasugacho, Tsukushigun, Toshio Yokouchi, Kanda, Minamidori, Amagasaki, and Hiroo Wada, Morishoji, Asahi-ku, Osaka, Japan, assignors to Sumitoko Chemical Co., Ltd., Osaka, Japan
No Drawing. Filed Aug. 27, 1962, Ser. No. 219,744
Claims priority, application Japan Aug. 25, 1961
20 Claims. (Cl. 195—30)

This invention relates to a process for producing L-methionine, more particularly to a process for producing L-methionine by the culturing of a microorganism on a nutrient medium containing γ-methylmercapto-α-hydroxybutyric acid or its salt to transform the latter to the desired L-methionine.

L-methionine or L-γ-methylmercapto-α-amino-n-butyric acid is one of the essential amino acids and is very useful not only as a medicine but also as a nutritive substance for human beings.

Chemical syntheses of DL-methionine are known. However, it is necessary to carry out the resolution of DL-methionine by a chemical or biochemical process for the obtainment of L-methionine which is commercially useful. Thus, only a half amount of the chemically synthesized DL-methionine is utilized in the old method. Furthermore a troublesome procedure is required to recover the useful compound from the mixture of the isomers by resolution.

Therefore, the primary object of this invention is to provide a novel, inexpensive and industrially advantageous method for producing L-methionine by culturing of a microorganism.

Another object of the invention is to provide a method for producing L-methionine, microbiologically, from γ-methylmercapto-α-hydroxybutyric acid or its salts with simple procedure and yet with an excellent yield.

More particularly, the object of this invention is to provide a method for producing L-methionine with an excellent yield by a single and simple culturing of a microorganism on a nutrient medium containing γ-methylmercapto-α-hydroxybutyric acid or its salt, the conversion to L-methionine being effected not only from L-γ-methylmercapto-α-hydroxybutyric acid but also even from D-γ-methylmercapto-α-hydroxybutyric acid.

Briefly, the process of this invention comprises culturing a microorganism which is capable, when cultured of converting γ-methylmercapto - α - hydroxybutyric acid to L-methionine, in a nutrient medium containing γ-methylmercapto-α-hydroxybutyric acid or its salt, and isolating the L-methionine accumulated in the fermentation broth.

The microorganisms useful in the present invention are distributed over a wide range of genus. Thus, among the microorganisms which have been found to be useful in the production of L-methionine according to this invention are those bacteria belonging to *Pseudomonas aeruginosa, Pseudomonas crusiviae, Pseudomonas dacunhae, Pseudomonas xanthe, Flavobacterium aeroguenes, Flavobacterium citri, Micrococcus pilotonensis, Micrococcus rubens, Micrococcus varians, Serratia marcescens, Bacillus cereus, Bacillus circulans, Bacillus megatherium, Bacillus pumilus, Bacillus sphaericus, Bacillus subtilis, Escherichia coli, Brevibacterium fulvum, Corynebacterium equi, Vibrio retshnikovii, Vibrio tyrogenes, Sarcina lutea, Aeromonas liquefaciens, Streptococcus hygroscopicus;* ray fungi such as *Streptomyces erythreus*; fungi such as *Penicillium islandius, Pencillium purporogenum*; yeasts such as *Torula lactis, Torula rubra, Torula utilis, Torula spora.* These microorganisms have been completely described in the literature and are well known in the art.

In addition to these microorganisms enumerated above, we have isolated 435 strains from specimens of soil and discovered that 284 strains among them are capable of converting γ-methylmercapto-α-hydroxybutyric acid to L-methionine. After further examination of the 284 strains, we have found that a new strain belonging to the genus Pseudomonas (referred to as Pseudomonas No. G–132–13 hereinafter) is particularly useful in the process of this invention, because this new strain or Pseudomonas No. G–132–13 is especially excellent in the capability of converting γ-methylmercapto-α-hydroxybutyric acid to L-methionine and does not show the tendency to decompose the produced L-methionine so that the desired product is accumulated in the fermentation broth in a higher yield.

The morphological characteristics of the strain of Pseudomonas No. G–132–13 are as follows.

(A) VEGETATIVE CELL (1) Form _____ Rod.
(2) Size _____ 0.8–1 x 2–3μ.
(3) Motility _____ Motile.
(4) Flagella _____ Monotrichous.
(5) Spore _____ Non-spore formation.
(6) Gram stain _____ Negative.

(B) CULTURAL CHARACTERISTICS (1) Surface colonies:
   (1) Form_____ Circula.
   (2) Margin_____ Entire.
   (3) Elevation_____ Convex.
   (4) Color_____ Grayish white.
(2) Agar slant:
   (1) Growth form _____ Fili form.
   (2) Color _____ Grayish white.
(3) Agar stab:
   Growth _____ Surface only.
(4) Gelatin stab:
   (1) Growth _____ Surface.
   (2) Liquefaction _____ None.
(5) Liquid culture:
   (1) Surface growth _____ Slightly ring.
   (2) Sediment _____ A little.
   (3) Turbidity _____ Turbid.

(C) PHYSIOLOGICAL CHARACTERISTICS (1) Temperature:
   (1) Optimum _____ 25–30° C.
   (2) Thermal death _____ 70° C., 10 minutes.
(2) Optimum pH _____ 6–8.
(3) Relation to free oxygen ___ Aerobic.
(4) Action of nitrates _____ Reducible.
(5) Production of $H_2S$ _____ Positive.
(6) Production of indol _____ Negative.
(7) Action on starch _____ No hydrolysis.
(8) Voges-Proskauer reaction __ Negative.
(9) Methyl red reaction _____ Negative.
(10) Litmus milk:
   (1) Reaction _____ Slightly alkaline.
   (2) Coagulation _____ None.
(11) Urease _____ Positive.
(12) Action on carbohydrates:

EXAMPLE 3

|  | Acid production | Gas production |
|---|---|---|
| Glucose | + | − |
| Xylose | + | − |
| Sucrose | − | − |
| Lactose | − | − |
| Raffinose | − | − |
| Dextrin | − | − |
| Mannose | − | − |
| Glycerin | − | − |
| Mannit | − | − |

(13) Vitamin requirement _____ Thiamine.

The above strain Pseudomonas No. G-132-13, according to Bergey's Manual of Determinative Bacteriology (7th edition), belongs to *Pseudomonas denitrificans*. This strain is on deposit in and is available from the public culture collection at Institute of Applied Microbiology, Tokyo University, Tokyo, as *Pseudomonas denitrificans* IAM-1923.

In carrying out the method of this invention such a microorganism as mentioned above which is capable of transforming γ-methylmercapto-α-hydroxybutyric acid to L-methionine is cultural in a culture medium.

The medium must contain γ-methylmercapto-α-hydroxybutyric acid or its salt. The acid may be in the L-form, D-form or DL-form. In this connection, it should be appreciated that the important advantage according to this invention is in that even D-γ-methylmercapto-α-hydroxybutyric acid can be converted to the desired L-methionine. Gamma-methylmercapto-α-hydroxybutyric acid may be added to the nutrient medium as free acid or as a water soluble salt such as calcium, ammonium or sodium salt. The amount of the γ-methylmercapto-α-hydroxybutyric acid or its salt may vary over a wide range, e.g. from 1 to 10% (as free acid), preferably about 2-5% by weight based on the total weight of the culture medium.

Except the indispensability of γ-methylmercapto-α-hydroxybutyric acid or its salt, the medium may be composed of usual ingredients conventionally used for the culturing of microorganisms. Thus, the medium contains carbon sources and nitrogen sources. These nutrient ingredients may be natural or artificial, and preferably are of liquid type. If necessary, minerals (inorganic salts) may be added. Examples of inorganic salts are potassium phosphate, magnesium sulfate, calcium carbonate, ferrous sulfate, zinc sulfate, manganese sulfate, etc. As for the carbon sources, commonly used organic carbon sources such as glucose, xylose, cane sugar, glycerin, starch, etc. may be employed. Among the nitrogen sources are peptone, yeast, extract, meat extract, corn steep liquor, etc.

It has been found to be preferable that the nitrogen source contains ammonia source, namely one or more of ammonia, its salts such as ammonium chloride, ammonium sulfate, ammonium phosphates, etc., and organic ammonium derivatives (in broad sense) such as urea, amino acid, proteins, etc.; because it favors the production of L-methionine preferably, the ammonia source is added in an amount of 1.2-3 moles (calculated as ammonia) per mole of γ-methylmercapto-α-hydroxybutyric acid or its salt initially present in the culture medium.

In carrying out the fermentation, submerged culture with aeration is suitable, although shaking or stationary culture may also be employed. In any case, the culture is carried out at a temperature of 25° to 40° C., preferably at about 30° C. It is desirable that pH of the medium is kept pH 6.5-9.0, preferably about 7.8-8.5, during the fermentation by adding an acid or alkaline substance. The fermenation is continued until the transformation of γ-methylmercapto-α-hydroxybutyric acid to L-methionine proceeds to the desired extent. Generally, the fermentation is continued for 1-3 days. In this way, there is obtained a fermentation broth which contains L-methionine which has been transformed from γ-methylmercapto-α-hydroxybutyric acid and accumulated during the fermentation. According to this method, L-methionine is obtained in yields up to about 80-95% based on γ-methylmercapto-α-hydroxybutyric acid employed.

The isolation of L-methionine from the fermentation broth may readily be carried out by any suitable manner known to the art in isolating an amino acid from a fermentation broth. Thus, for example, active charcoal for decolorization is added to the broth, which pH is adjusted to acidic (e.g. pH 2-5) with an inorganic acid such as hydrochloric acid, sulfuric acid, etc. or an organic acid such as oxalic acid, acetic acid, etc. to precipitate impurities such as protein, and then the broth is filtered by centrifuge or conventional filtration with or without a filter aid. The filtrate is adjusted to a pH substantially equal to the isoelectric point of L-methionine or a pH of 5.6-6.0 before or after the concentration (e.g. in vacuo), whereupon L-methionine precipitates. The precipitate is collected and may be recrystallized in a conventional manner. The operative order for obtaining the said filtrate is not critical. Thus, the fermentation broth, after filtration, may have decolorization charcoal added thereto at a pH of 2-5 and then filtered.

Alternatively, the isolation may also be effected by the use of an ion-exchange resin. The adsorption-elution process using such ion-exchange resin is well known to those skilled in the art for the isolation of amino acids, and therefore no detailed explanation thereabout is necessary.

The following examples are given solely for the purpose of illustration and are not to be construed as limitations of this invention, many variations of which are possible without departing from the spirit or scope thereof.

*Example 1*

A fermentation medium comprising the following ingredients was prepared:

| | G. |
|---|---|
| DL-γ-methylmercapto-α-hydroxybutyric acid calcium salt | 20 |
| Glucose | 20 |
| Corn steep liquor | 40 |
| Ammonium chloride | 10 |
| Monopotassium phosphate | 0.5 |
| Magnesium sulfate | 0.1 |
| Water to 1 liter. | |

The medium was adjusted to pH 7.8 and a seed of the strain of Pseudomonas No. G-132-13 was inoculated therein and subjected to shaking culture at 30° C. for 48 hours. After the incubation the fermentation broth containing 13.2 g. of L-methionine was adjusted to pH 3.6 with hydrochloric acid and heated to 100° C. Active carbon was added to the hot broth, and the mixture was filtered to obtain a filtrate, which was then subjected to vacuum concentration. The concentrate was adjusted to pH 5.6 with caustic soda and upon cooling L-methionine crystals precipitated. The crystals were collected and recrystallized from water. The yield of L-methionine was 10.6 g. The specific optical rotation $[\alpha]_D^{20} + 23.40$ (0.2 N HCl).

*Example 2*

The strain of Pseudomonas No. G-132-13 was inoculated in one liter of the fermentation medium (pH 7.8) of the following composition:

| | Percent |
|---|---|
| DL-γ-methylmercapto-α-hydroxybutyric acid ammonium salt | 2.64 |
| Glucose | 5 |
| Corn steep liquor | 2 |
| Ammonium chloride | 0.25 |
| Water to one liter. | |

After subjecting to shaking culture at 30° C. for 48 hours, there was obtained a fermentation broth containing 20.9 g. of L-methionine.

The broth was treated in the same manner as described in Example 1; there was obtained 17.8 g. of pure L-methionine crystals.

*Example 3*

The strain of Pseudomonas No. G-132-13 was inoculated in 1.5 liters of medium of the same composition as that used in Example 2 and subjected to shaking culture at 30° C. for 24 hours. The seed was then transferred to a fermenter containing 150 liters of the same fermentation medium. Submerged culture was carried out at 30° C. while stirring and with aeration of 150 l./min. and interior pressure (gauge) of 0.3-0.5 kg./cm.$^2$. The pH of the medium was maintained at 7.8–8.0 by adding an alkaline solution during the culture. After incubation for 44 hours, there was obtained 150 liters of the fermentation broth containing 3.07 kg. of L-methionine. The fermentation broth was treated in the same manner as described in Example 1 to obtain 2.30 kg. of pure L-methionine crystals.

Example 4

*Pseudomonas xanthe* was inoculated in one liter of medium of the same composition as that employed in Example 1, and subjected to shaking culture at 30° C. for 48 hours. After the incubation the fermentation broth containing 11.4 g. of L-methionine was treated in the same manner as described in Example 1, to obtain 8.6 g. of pure L-methionine crystals.

Example 5

*Serratia marcescens* was inoculated in one liter of medium of the same composition as that used in Example 1, and subjected to shaking culture at 30° C. for 72 hours. After the incubation the fermentation broth containing 10.8 g. of L-methionine was treated in the same manner as described in Example 1 to obtain 8.1 g. of pure L-methionine crystals.

Example 6

*Streptomyces erythreus* was inoculated in one liter of medium of the same composition as that used in Example 1, and subjected to shaking culture at 30° C. for 72 hours. After the incubation the fermentation broth containing 2.1 g. of L-methionine was treated in the same manner as described in Example 1 to obtain 1.47 g. of pure L-methionine crystals.

Example 7

*Penicillium islandium* was inoculated in one liter of culture medium of the same composition as that used in Example 1, and subjected to shaking culture at 30° C. for 72 hours. After the incubation the fermentation broth containing 2.3 g. of L-methionine was treated in the same manner as described in Example 1 to obtain 1.61 g. of pure L-methionine crystals.

Example 8

A fermentation medium comprising the following ingredients was prepared:

|  | G. |
|---|---|
| DL-γ-methylmercapto-α-hydroxybutyric acid calcium salt | 10 |
| Glucose | 20 |
| Peptone | 5 |
| Meat extract | 5 |
| Yeast extract | 3 |
| Ammonium chloride | 5 |
| Monopotassium phosphate | 0.5 |
| Magnesium sulfate | 0.1 |

Water to 1 liter.

The medium was adjusted to pH 6.8. *Torula lactis* was inoculated in this medium and subjected to shaking culture at 27° C. for 96 hours. After the incubation the fermentation broth containing 1.02 g. of L-methionine was treated in the same manner as described in Example 1 to obtain 0.71 g. of pure L-methionine crystals.

What we claim is:
1. A process for the preparation of L-methionine which comprises culturing a microorganism which when cultured, converts γ-methylmercapto-α-hydroxybutyric acid to L-methionine, in a nutrient medium containing a member selected from the group consisting of γ-methylmercapto-α-hydroxybutyric acid and its salts until there has been an accumulation of L-methionine in the fermentation broth, and isolating L-methionine thus accumulated in the fermentation broth.
2. A process for the preparation of L-methionine according to claim 1, wherein the medium contains carbon source and nitrogen source.
3. A process according to claim 2, wherein the nitrogen source contains ammonia source.
4. A process according to claim 1, wherein the culturing is carried out at a temperature of 25° C.–40° C. and at a pH of 6.5–9.0.
5. A process according to claim 1, wherein the microorganism is selected from those belonging to the genus Pseudomonas.
6. A process according to claim 1, wherein the microorganism is *Pseudomonas denitrificans* IAM–1923.
7. A process according to claim 1, wherein the microorganism is *Serratia marcescens*.
8. A process according to claim 1, wherein the microorganism is *Streptomyces erythreus*.
9. A process according to claim 1, wherein the microorganism is selected from those belonging to the genus Penicillium.
10. A process according to claim 9, wherein the microorganism is *Penicillium islandium*.
11. A process according to claim 1, wherein the microorganism is selected from those belonging to the genus Torula.
12. A process according to claim 11, wherein the microorganism is *Torula lactis*.
13. A process according to claim 2, wherein the fermentation is carried out at a temperature of 25° C.–40° C. and at a pH of 6.5–9.0.
14. A process according to claim 3, wherein the fermentation is carried out at a temperature of 25° C.–40° C. and at a pH of 6.5–9.0.
15. A process according to claim 2, wherein the microorganism is selected from those belonging to the genus Pseudomonas.
16. A process according to claim 3, wherein the microorganism is selected from those belonging to the genus Pseudomonas.
17. A process according to claim 2, wherein the microorganism is *Pseudomonas denitrificans* IAM–1923.
18. A process according to claim 3, wherein the microorganism is *Pseudomonas denitrificans* IAM–1923.
19. A process according to claim 1, wherein the microorganism is *Pseudomonas xanthe*.
20. A process according to claim 1, wherein the γ-methylmercapto-α-hydroxybutyric acid compound is in one of the forms D-, L- and DL-.

No references cited.